April 12, 1927.
L. R. MOORE
TIRE PATCH
Filed May 3, 1926
1,624,619
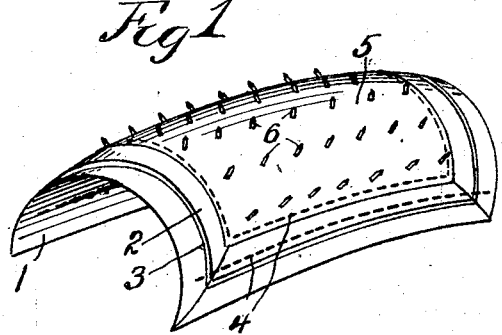
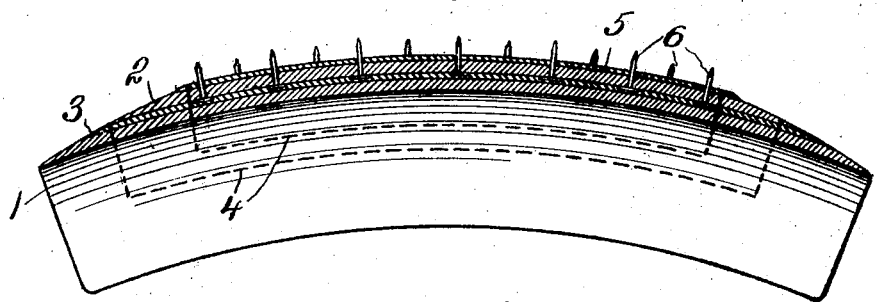
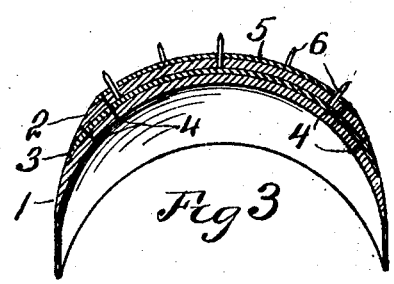
INVENTOR.
Lee R. Moore,
BY
Warren L. House,
His ATTORNEY.
Witness:
R. E. Hamilton Patented Apr. 12, 1927.

1,624,619

UNITED STATES PATENT OFFICE.

LEE R. MOORE, OF KANSAS CITY, MISSOURI.

TIRE PATCH.

Application filed May 3, 1926. Serial No. 106,407.

My invention relates to improvements in tire patches. It relates particularly to blow out patches of the type having superposed layers of fabric derived from old tires and cemented together, tacks, or other pointed devices being extended through and projecting from the outer layer for engaging the tire casing, when the patch is used as a blow out shoe.

In the use of such devices, it has been found that the patches, when heated by use, will have its cemented layers peel apart, and the tacks loosen, and cause damage by working around in the casing.

One of the objects of my invention is to so fasten together the fabric layers that they will not separate by heat, and another object is to provide a construction in which the tacks will be securely held, and with which they will become cemented to the casing the inner surface of which they pierce.

A further object of my invention is to provide a novel tire patch of the kind described, which is simple, cheaply made, durable, not liable to get out of order, and which is efficient for the purpose for which it is intended.

The novel features of my invention are hereinafter fully described and claimed.

In the accompanying drawing, which illustrates the preferred embodiment of my invention, Fig. 1 is a perspective view of my improved patch.

Fig. 2 is a longitudinal vertical sectional view of the same, enlarged.

Fig. 3 is a cross section, enlarged, of the same.

Similar reference characters designate similar parts in the different views.

1 designates an inner layer of fabric, such as is obtained by cutting up old casings. 2 designates an outer layer of such fabric of less area. Intermediate of said layers 1 and 2 is provided a layer of material which will cement the layers together, and which may be rubber cement or uncured rubber 3. To reliably hold the layers together, when the tire and the patch becomes heated, the layers are sewed together with thread 4, the stitching extending through all the layers.

Upon the outer fabric layer 2 is mounted a layer of uncured rubber 5. Tacks 6 extend through the fabric layer 2 and the rubber layer 5, the tacks extending beyond the layer 5 so that they will pierce the casing in which the patch is placed, to prevent the patch from slipping in the casing.

The outer rubber layer 5 has a double function. It serves to cement the shoe to the casing after the latter becomes heated in running, and it fills in the holes made by the tacks in the fabric layer 2 and those which the tacks make in the casing. The cementing material 3, and the uncured rubber layer 5 will hold the heads of the tack firmly at the inner side of the layer 2.

The shoe, when applied in a casing, will become an integral part thereof, and will firmly hold the tacks. The stitching 4 extending through all the layers of fabric and rubber firmly holds the layers together, after the heated casing makes the rubber soft and causes it to flow. In turn the heated uncured rubber will follow through the stitch openings, filling them, and making the threads integral with the mass.

I do not limit my invention to the structure shown and described, as modifications within the scope of the appended claim, may be made without departing from the spirit of my invention.

What I claim is:—

A tire patch comprising an inner layer of fabric, an outer layer of fabric, cementing material between said layers, stitching extending through said layers and said cementing material, a layer of uncured rubber overlying the outer side of said layers of fabric, and tacks extending through the outer layer of fabric and through the layer of uncured rubber and projecting outwardly beyond the latter and having their heads embedded in said cementing material.

In testimony whereof I have signed my name to this specification.

LEE R. MOORE.